(12) United States Patent
Morgenstern et al.

(10) Patent No.: US 11,940,051 B2
(45) Date of Patent: Mar. 26, 2024

(54) SLIDE RING SEAL ASSEMBLY WHICH CAN BE AXIALLY MOUNTED

(71) Applicant: EagleBurgmann Germany Gmbh & Co. KG, Wolfratshausen (DE)

(72) Inventors: Florian Morgenstern, Rosenheim (DE); Christoph Rapp, Sauerlach (DE); Christian Fahning, Penzberg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 17/641,752

(22) PCT Filed: Jul. 9, 2020

(86) PCT No.: PCT/EP2020/069332
§ 371 (c)(1),
(2) Date: Mar. 9, 2022

(87) PCT Pub. No.: WO2021/052649
PCT Pub. Date: Mar. 25, 2021

(65) Prior Publication Data
US 2022/0373092 A1 Nov. 24, 2022

(30) Foreign Application Priority Data
Sep. 19, 2019 (DE) ..................... 10 2019 214 252.4

(51) Int. Cl.
*F16J 15/34* (2006.01)
(52) U.S. Cl.
CPC ....... *F16J 15/3464* (2013.01); *F16J 15/3484* (2013.01)
(58) Field of Classification Search
CPC .... F16J 15/3464; F16J 15/3472; F16J 15/348; F16J 15/3484
See application file for complete search history.

(56) References Cited

U.S. PATENT DOCUMENTS 5,505,465 A 4/1996 Hornsby
5,558,342 A 9/1996 Sedy
(Continued)

FOREIGN PATENT DOCUMENTS

| DE | 9011145 U1 | 10/1990 |
| WO | 2014/180593 A1 | 11/2014 |
| WO | 2019/034519 A1 | 2/2019 |

OTHER PUBLICATIONS

International Search Report issued in PCT/EP2020/069332, dated Sep. 30, 2020.

*Primary Examiner* — Nicholas L Foster
(74) *Attorney, Agent, or Firm* — Locke Lord LLP; Scott D. Wofsy; Michael J. Pollack

(57) ABSTRACT

The invention relates to a mechanical seal arrangement comprising a first slide ring seal (2) having a rotating slide ring (21) and a stationary slide ring (22) defining a sealing gap (23) therebetween, a shaft sleeve (4), a driver (5) which connects the shaft sleeve (4) to the rotating slide ring (21) and which is arranged to transmit rotation of the shaft sleeve (4) to the rotating slide ring (21) a connecting arrangement (6) for connecting the shaft sleeve (4) to the driver (5), the connecting arrangement (6) comprising at least two rotary locks (60) and at least two recesses (40) in the shaft sleeve (4), wherein each of the rotary locks (60) has a bearing portion (61) and a locking portion (62), wherein the locking portion (62) laterally projects beyond the bearing portion (61), and wherein a rotational axis (Y-Y) of each rotary lock (60) is parallel to a central axis (X-X) of the shaft sleeve (4).

11 Claims, 4 Drawing Sheets

(56) References Cited

U.S. PATENT DOCUMENTS

Figure 1:
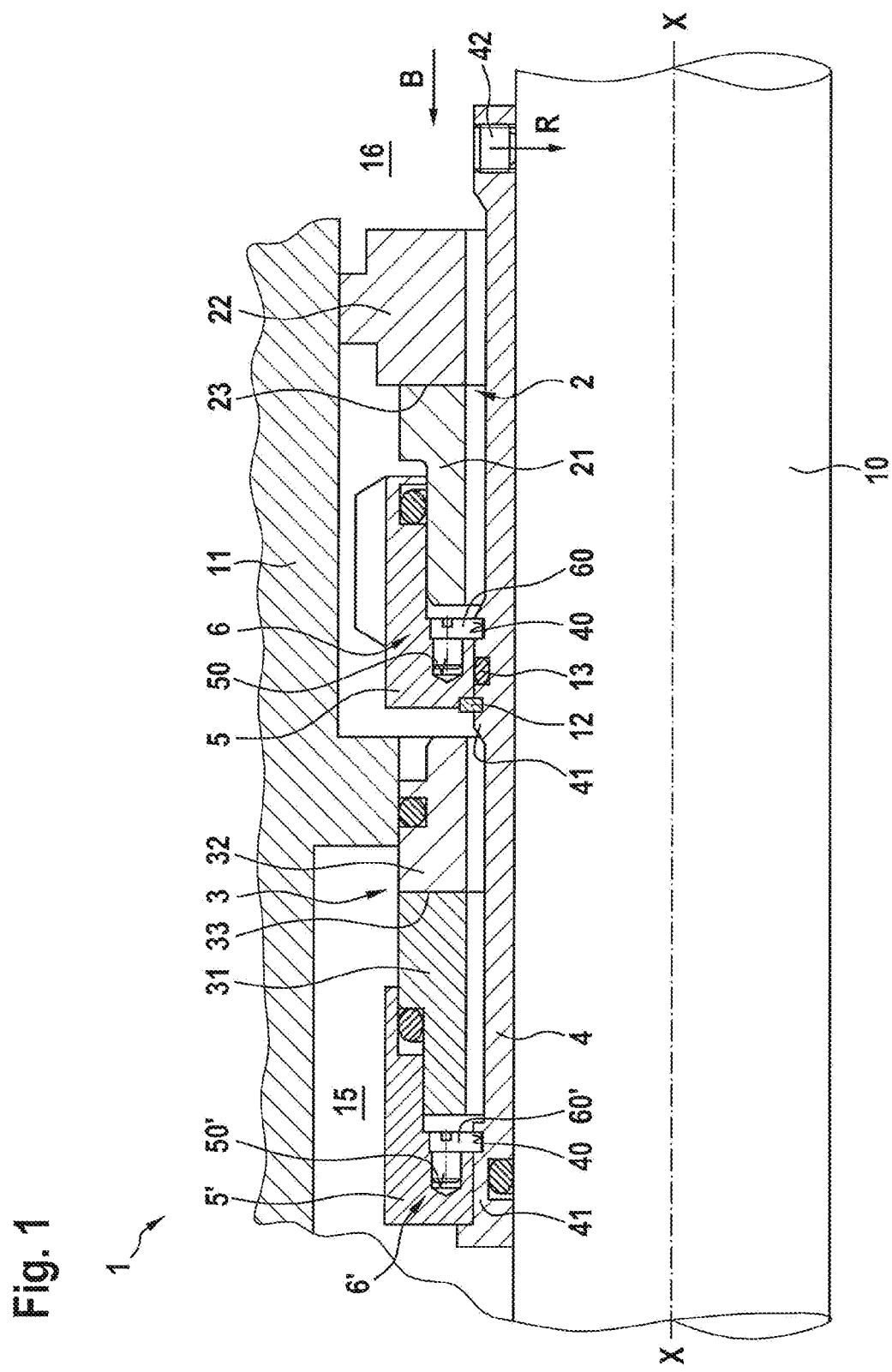

| | | | | |
|---|---|---|---|---|
| 6,250,642 B1* | 6/2001 | Ciotola | ............... | F16J 15/348 |
| | | | | 277/370 |
| 6,935,632 B2* | 8/2005 | Azibert | ............... | F16J 15/3464 |
| | | | | 277/371 |
| 11,022,180 B2* | 6/2021 | Mehmedovic | ....... | F16J 15/3464 |
| 11,333,252 B2* | 5/2022 | Ongerth | ............... | F16J 15/3468 |
| 11,435,000 B2* | 9/2022 | Richter | ............... | F16J 15/38 |
| 2002/0070505 A1* | 6/2002 | Auber | ............... | F16J 15/3464 |
| | | | | 277/358 |
| 2004/0169336 A1* | 9/2004 | Azibert | ............... | F16J 15/3464 |
| | | | | 277/370 |
| 2005/0242515 A1* | 11/2005 | Brooks | ............... | F16J 15/3484 |
| | | | | 277/370 |
| 2005/0242516 A1* | 11/2005 | Azibert | ............... | F16J 15/3464 |
| | | | | 277/370 |
| 2012/0001394 A1* | 1/2012 | Suefuji | ............... | F16J 15/3468 |
| | | | | 277/369 |
| 2012/0187636 A1* | 7/2012 | Suefuji | ............... | F16J 15/34 |
| | | | | 277/387 |
| 2016/0238136 A1* | 8/2016 | Fichtner | ............... | F16B 3/00 |
| 2018/0372160 A1* | 12/2018 | Mehmedovic | .......... | F16D 1/096 |
| 2020/0240522 A1* | 7/2020 | Ongerth | ............... | F16J 15/3472 |
| 2020/0378502 A1* | 12/2020 | Richter | ............... | F16J 15/38 |
| 2021/0231219 A1* | 7/2021 | Droscher | ............. | F16J 15/3464 |
| 2023/0055493 A1* | 2/2023 | Zhao | ............... | F16J 15/3464 |

* cited by examiner

SLIDE RING SEAL ASSEMBLY WHICH CAN BE AXIALLY MOUNTED

CROSS-REFERENCE TO RELATED APPLICATIONS

This application is a U.S. National Phase Application filed under 35 U.S.C. § 371, based on International Patent Application No. PCT/EP2020/069332, filed Jul. 9, 2020, which claims priority to German Patent Application No. 10 2019 2140252.4, filed on Sep. 19, 2019, which are all incorporated herein by reference.

The invention relates to a mechanical seal arrangement which allows simplified mounting from the axial direction.

Mechanical seals having various designs are known from prior art. Sealing using a mechanical seal arrangement is done at or near one end of a shaft. Due to installation space problems, attempts are often made to design machines that will be sealed using a maximally short mechanical seal arrangement in the axial direction. Attempts are made to mount the mechanical seal arrangement as far as possible in the direction of the portion to be sealed in the axial direction. However, this may result in assembly problems, as the mechanical seal arrangement is often fixed on a shaft sleeve that is connected to the shaft. So-called drivers are used to transmit the rotational force from the shaft sleeve connected to the shaft to a rotating slide ring. The drivers are to be firmly connected to the shaft sleeve so as to transmit torque from the shaft sleeve via the driver to the rotating slide ring. So far, this has been done, for example, by making a screw connection in the radial direction between the driver and the shaft sleeve. However, if the mechanical seal arrangement is arranged too deep inside the housing in the axial direction, it is no longer possible to make such radial connection, as it is not possible to reach inside the housing with a tool to radially fix or release the driver by screws to the shaft sleeve.

It is therefore the object of the present invention to provide a mechanical seal arrangement which can be arranged very deep inside a housing of a machine, and having a simple structure and easy, low-cost manufacturability.

This object will be solved by a mechanical seal arrangement having the features of claim 1. The subclaims show preferred further embodiments of the invention.

The mechanical seal arrangement according to the invention having the features of claim 1 thus has the advantage that it is possible to mount the mechanical seal arrangement very deep in an inner region of a housing of a machine. As a result, an axial overall length of the machine can significantly be reduced, as the mechanical seal arrangement, which is usually arranged at one end or near one end of a shaft, can be positioned very deep inside the housing. According to the invention, this will be achieved by the mechanical seal arrangement comprising a first mechanical seal, a rotating slide ring and a stationary slide ring defining a sealing gap therebetween. Furthermore, the mechanical seal arrangement comprises a shaft sleeve and a driver connecting the shaft sleeve to the rotating slide ring for torque transmission. This allows torque to be transmitted from the shaft sleeve, which is connected to the rotating shaft, to the rotating slide ring via the driver. Further, a connection arrangement is provided for connecting the driver to the shaft sleeve, the connection arrangement comprising at least two rotary locks and at least two recesses in the shaft sleeve. Each rotary lock includes a bearing portion and a locking portion, the locking portion projecting laterally beyond the bearing portion. A rotational axis of each rotary lock is parallel to a central axis of the shaft sleeve. This allows the rotary lock to be actuated from the axial direction from outside the housing and to engage with the recess in the shaft sleeve by twisting. This enables torque transmission from the shaft sleeve to the driver and from the driver to the rotating slide ring connected to the driver. Herein, a form-fit connection between the shaft sleeve and the driver is realized by the connection arrangement. A form-fit exists between the connecting arrangement and the shaft sleeve and between the connecting arrangement and the driver. In this case, the form-fit between the connecting arrangement and the shaft sleeve is achieved by rotating the connecting arrangement, preferably by 90°.

Further preferably, the rotary lock comprises a tool holder. This allows the rotary lock to be easily rotated from the axial direction. The tool accommodation is a slot or cross slot or the like for a screwdriver or an inner polygon or outer polygon of the rotary lock, for example.

Particularly preferably, the bearing portion of the rotary lock is a cylinder which is arranged in a cylindrical recess in the driver. This allows the rotary lock to be securely and easily inserted into the driver and rotated. The driver thus serves as a bearing for the rotary lock. Preferably, a cylindrical axis of the bearing portion defines a rotational axis of the rotary lock.

According to another preferred embodiment of the present invention, the locking portion has a length which is at least twice as long as a diameter of the cylindrical bearing portion.

For particularly simple and inexpensive manufacture, the recess for receiving the rotary lock in the shaft sleeve preferably has an arcuate bottom.

Further preferably, a free end of the locking portion is also arc-shaped. Preferably, a first radius of the arcuate bottom in the shaft sleeve is equal to a second radius of the free end of the locking portion of the rotary lock. This allows easy pivoting of the rotary lock about the cylinder axis.

According to another preferred embodiment of the invention, a first rotary lock is rotatable for locking in a first rotational direction and a second rotary lock is rotatable for locking in a second rotational direction which is opposite to the first rotational direction. This ensures that torque can be transmitted from the shaft sleeve to the driver in both rotational directions.

To enable particularly secure torque transmission, the connection arrangement further comprises a securing device for securing a position of the rotary lock in the recess in the shaft sleeve. Preferably, the securing device is a securing screw, which is screwed into the driver adjacent to the rotary lock. This prevents the rotary lock from turning in the locked position in the shaft sleeve.

To ensure torque transmission in both rotational directions, a first locking screw is preferably arranged on a first circumferential side of a first rotary lock, and a second locking screw is arranged on a second circumferential side, opposite to the first circumferential side, on a second rotary lock. As a result, the first rotational latch is secured in the first rotational direction and the second rotational latch is secured in the second rotational direction.

Further preferably, the mechanical seal arrangement comprises a second mechanical seal having rotating and stationary slide rings defining a sealing gap therebetween. This means that the mechanical seal arrangement is provided as a tandem arrangement. In this case, the second mechanical seal is secured to the shaft sleeve similar to the first mechanical seal using a preferably identical connection arrangement.

Preferably, the mechanical seal arrangement is used in a pump or compressor.

Figure 2:
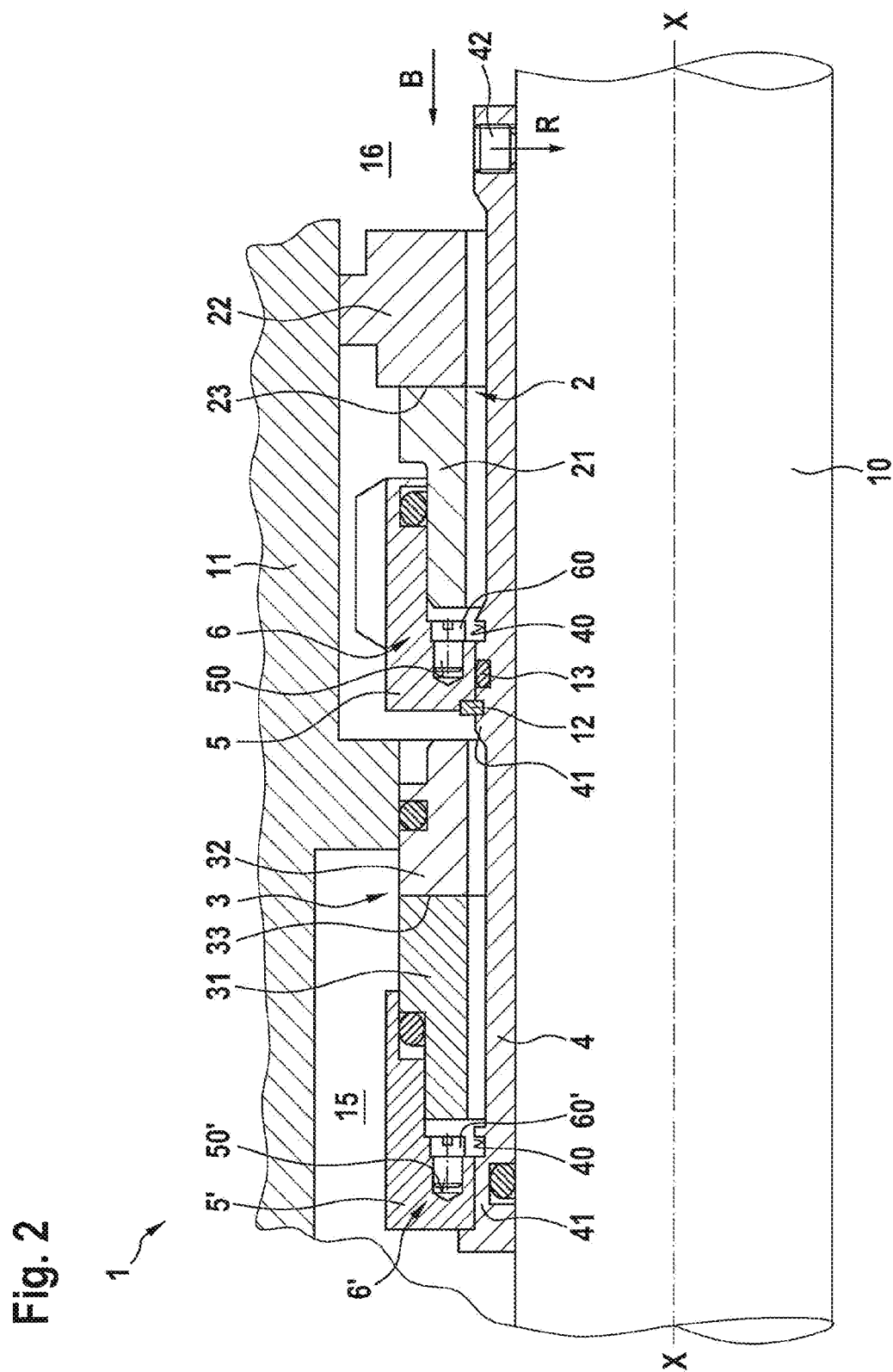
Figure 3:
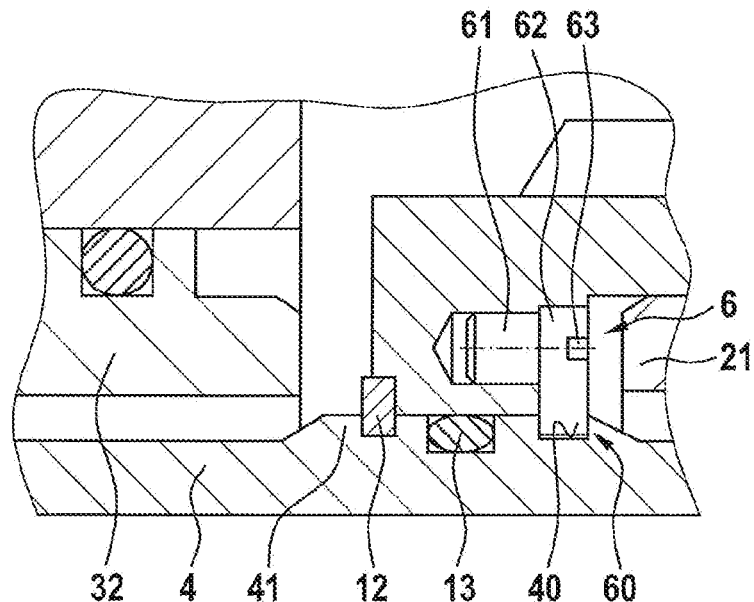
Figure 4:
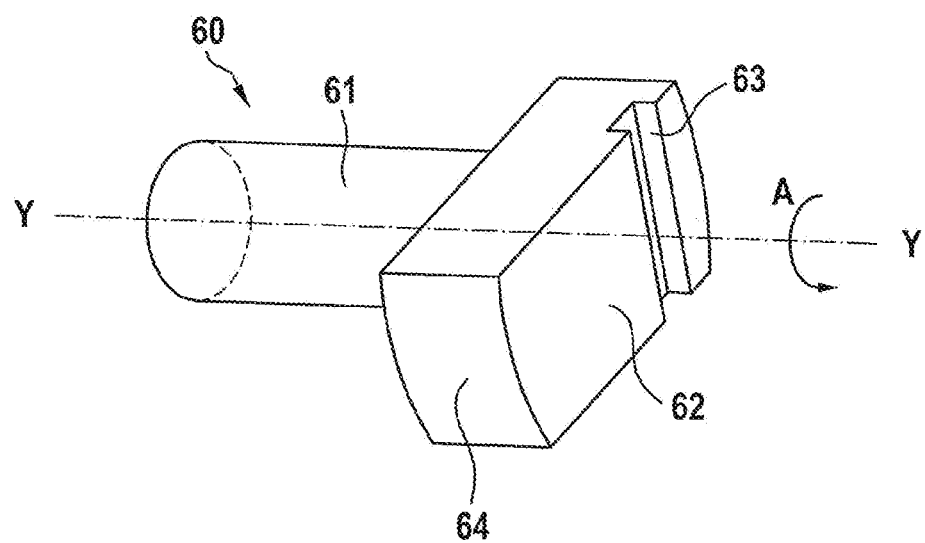
Figure 5:
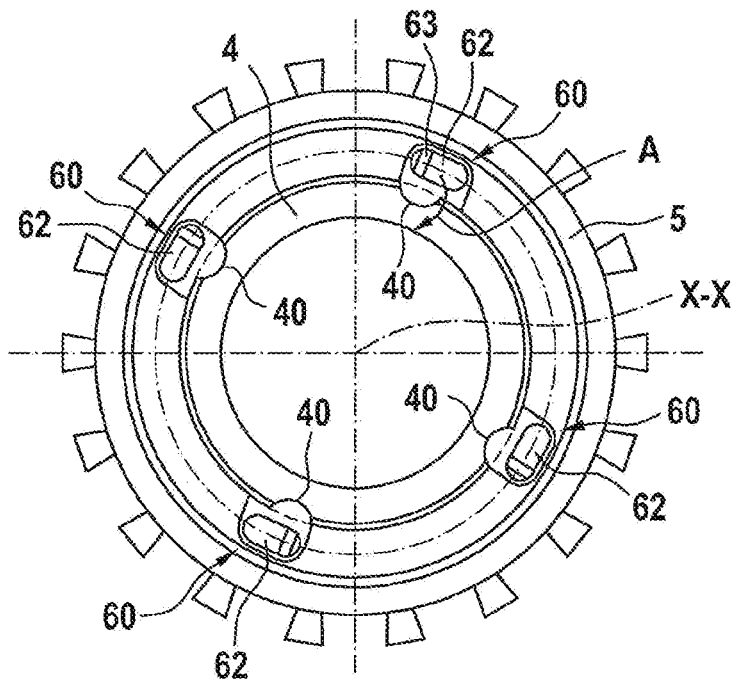

In the following, a preferred embodiment of the invention will be described in detail, while reference will be made to the accompanying drawing, wherein FIG. 1 is a schematic sectional view of a mechanical seal arrangement in the mounted state with the connection arrangement being locked, FIG. 2 is a schematic sectional view of the mechanical seal arrangement of FIG. 1 in the unlocked state, FIG. 3 is a schematic, enlarged partial sectional view of the mechanical seal arrangement of FIG. 1, FIG. 4 is a schematic, perspective view of a rotary lock of the slide ring seal arrangement of FIG. 1, FIG. 5 is a schematic top view of the mechanical seal arrangement of FIG. 1 in the unlocked state, and FIG. 6 a is schematic top view of the mechanical seal arrangement of FIG. 1 in the locked and secured state.

In the following, a mechanical seal arrangement 1 according to a preferred embodiment of the invention will be described in detail, while making reference to FIGS. 1 to 6, As can be seen from FIG. 1, the mechanical seal arrangement 1 comprises a first slide ring seal 2 and a second slide ring seal 3. The first slide ring seal 2 comprises a rotating slide ring 21 and a stationary slide ring 22 defining a sealing gap 23 therebetween. The second mechanical seal 3 comprises a rotating slide ring 31 and a stationary slide ring 32 defining a sealing gap 33 therebetween. The first and second mechanical seals are serially arranged behind each other in the axial direction X-X.

The mechanical seal arrangement 1 seals a product side 15 from an atmosphere side 16.

As can be seen from FIG. 1, the mechanical seal arrangement 1 is deeply inserted into an inner portion of a housing 11 of a machine. As a result, a short axial design of the overall machine will be achieved.

The mechanical seal arrangement 1 further comprises a shaft sleeve 4 which is fixed on a shaft 10. As can be seen from FIG. 1, the shaft sleeve 4 is fixed to the shaft 10 using a screw 42. The screw 42 is screwed onto the shaft in radial direction R.

Conventionally, the drivers of the mechanical seal arrangement are also fixed on the shaft sleeve 4 using screws screwed in radially to the shaft. This will be prevented by positioning the mechanical seal arrangement 1 deep inside the housing 11. Moreover, release of such radially screwed-in screw will also be avoided. Therefore, a connecting arrangement 6 is provided according to the invention, which connects a driver 5, 5' to the shaft sleeve 4 and which can be actuated in the axial direction X-X.

As can be seen from FIG. 1, the first mechanical seal 2 has a first driver 5 which is connected to the shaft sleeve 4 and transmits a torque from the shaft sleeve 4 to the first rotating slide ring 21 of the first mechanical seal 2. The driver 5 comprises recesses 50 in which the connecting arrangements 6 are mounted in the driver.

Herein, a circumferentially thickened portion 41 is provided on the shaft sleeve 4. The connecting arrangement 6 comprises a rotary lock 60, which is shown in detail in FIG. 4, and a recess 40, which is provided in the shaft sleeve 4.

In addition, a circlip 12 and an O-ring 13 are arranged at the on the thickened portion 41, as can be seen especially from FIG. 3. As can be seen from FIG. 3, the O-ring 13 is thus arranged in the axial direction between the circlip 12 and the recess 40. The circlip 12 thus prevents axial movement of the driver 5 in the direction of the second mechanical seal 3.

The rotary lock 60 can be seen in detail in FIG. 4. In addition to a cylindrical bearing portion 61 and a locking portion 62 projecting laterally beyond the cylindrical bearing portion 61, the rotary lock 60 furthermore comprises a tool attachment 63 at the locking portion 62. In this embodiment, the tool projection 63 is a slot for receiving a screwdriver or the like. A free end 64 of the locking portion 62 that protrudes beyond the bearing portion 61 is arcuate. A radius of the arcuate end 64 corresponds to a radius of a bottom of the recess 40 in the shaft sleeve 4. As indicated in FIG. 4, the rotary lock 60 is pivotable about a pivot axis Y-Y which is parallel to the center axis in the axial direction X-X of the mechanical seal arrangement 1.

Figure 6:
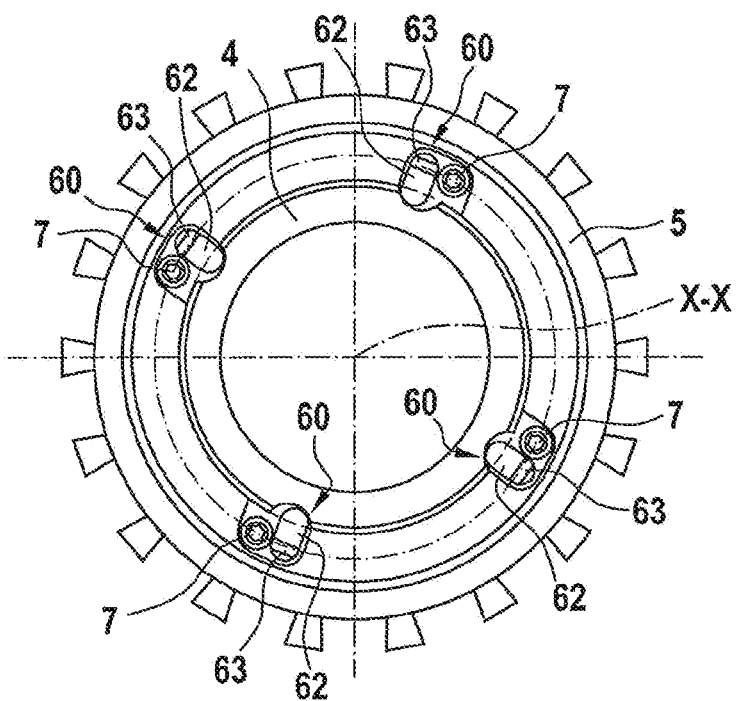

As can be seen from FIGS. 5 and 6, four connecting arrangements 6 are provided along the circumference, each with a rotary lock 60. The connecting arrangements 6 are thereby arranged at equal intervals along the circumference.

To secure a locking position of the rotary locks 60, the mechanical seal arrangement 1 further comprises a securing device 7 in the form of screws. As can be seen from FIG. 6, the securing devices 7 are positioned immediately adjacent in the circumferential direction to the rotary locks 60. As can be seen from FIG. 6, in this connection, the securing devices 7 are each arranged on circumferentially adjacent rotary locks 60 on the other circumferentially adjacent side of the rotary locks 60, as can be seen from FIG. 6. This enables securing the connection arrangement 6 between the driver 5 and the shaft sleeve 4 in both rotational directions.

An identical connection arrangement 6' with a driver 5' and a recess 50' as well as a rotary lock 60' is provided on the second mechanical seal 3.

The improved connection arrangement 6, 6' between the drivers 5, 5' and the shaft sleeve 4 thus allows axial assembly of the drivers in the direction of arrow B of FIG. 1. Herein, the shaft sleeve 4 is first fixed to the shaft 10 using the screw 42. Then, the driver 5' of the second mechanical seal 3 is pushed over the shaft sleeve 4 in the axial direction (arrow B) and is fixed in the position shown in FIG. 1. For this purpose, the rotary locks 60' are inserted in the axial direction into the recesses 50' in the driver 5' and are in the position shown in FIG. 5, i.e. the locking portions 62 essentially extend in the circumferential direction. The respective tool attachment 63 of the rotary locks 60', which is designed as a slot, is aligned in the radial direction (cf. FIG. 5). For fixing the driver 5' to the shaft sleeve 4, the tool is now attached to the tool shoulder 63 of each rotary lock 60 in the axial direction X-X using a long, rod-like tool and, as indicated by the arrow A in FIG. 5, the rotary lock 60 is pivoted through 90°. This brings the locking portion 62 into contact with the recess 40 in the shaft sleeve 4, such that a torque-transmitting connection will be established between the shaft sleeve 4 and the driver 5'. The rotating slide ring 31 and stationary slide ring 32 are then slid over the shaft sleeve 4 into the position shown in FIG. 1. Following this, the driver 5 of the first seal ring direction is mounted on the shaft sleeve 4 in the same way, thereby also first inserting the rotary locks 60 into the recesses 50 of the driver 5 in the position shown in FIG. 5 and subsequently rotating them in the direction of arrow A.

To secure the rotated position of the rotary locks, another screw is screwed into the driver 5' as a securing device 7 immediately adjacent to each of the rotated rotary locks 60 following rotation thereof. This prevents the rotary locks 60 from turning back.

A comparison of FIGS. 1 and 2 again illustrates the neat torque connection between the drivers 5 and the shaft sleeve 4 according to the invention. FIG. 2 shows the rotary locks 60 in the non-swiveled state, in which the bow-shaped ends are not arranged in the recess 40 in the shaft sleeve 4. FIG. 1, which shows the pivoted, i.e. locked, positions of the rotary locks 60, illustrates that the rotary locks 60 have been pivoted 90° so that the locking portions 62 of the rotary locks 60 are in engagement with the recesses 40 in the shaft sleeve 4. This allows torque to be transmitted from the shaft sleeve 4 to the drivers 5 or 5' via the rotary locks 60 located in the recess 40.

In order not to excessively weaken the shaft sleeve 4 by the recesses 40, the thickened portion 41 are provided, which is arranged radially inside the drivers 5 or 5'. The recesses 40 in the shaft sleeve 4 can be produced, for example, using a milling cutter or the like. This results in the arcuate bottom in the recesses 40. A radius of this arcuate bottom of the recess 40 preferably corresponds to a radius of the arcuate end 64 of the rotary lock 60.

Thus, a simple and inexpensive connection arrangement 6, 6' between drivers 5, 5' and the shaft sleeve 4 can be realized. The rotary locks 60, 60' can thus be provided as inexpensively producible components, especially castings. An assembly of the rotary locks is easily realized by a simple, 90° swiveling operation. The position of the rotary locks is additionally secured by the securing devices 7.

LIST OF REFERENCE NUMBERS 1 mechanical seal arrangement
2 first mechanical seal
3 second mechanical seal
4 shaft sleeve
5, 5' driver
6, 6' connecting arrangement
7 securing device
10 shaft
11 housing
12 circlip
13 O-ring
15 product side
16 atmosphere side
21 rotating slide ring
22 stationary slide ring
23 sealing gap
31 rotating slide ring
32 stationary slide ring
33 sealing gap
40 recess
41 thickened portion of shaft sleeve
42 screw
50, 50 recess in driver
60, 60' rotary lock
61 bearing portion
62 locking portion
63 tool attachment/slot
64 curved end of locking portion
A swivel direction of the rotary lock
B axial mounting direction
R radial direction
X-X center axis of the mechanical seal arrangement
Y-Y swivel axis

The invention claimed is:

1. A mechanical seal arrangement comprising:
a first mechanical seal comprising a rotating slide ring and a stationary slide ring defining a sealing gap therebetween,
a shaft sleeve,
a driver which connects the shaft sleeve to the rotating slide ring and which is arranged to transmit rotation of the shaft sleeve to the rotating slide ring,
a connection arrangement for connecting the shaft sleeve to the driver,
wherein the connection arrangement comprises at least two rotary locks and at least two recesses in a radially outer surface of the shaft sleeve,
wherein each of the rotary locks has a bearing portion and a locking portion, each locking portion projecting laterally beyond each bearing portion and each locking portion adapted to engage a respective one of the at least two recesses, and
wherein a rotational axis (Y-Y) of each rotary lock is parallel to a central axis (X-X) of the shaft sleeve.

2. The mechanical seal arrangement according to claim 1, wherein each rotary lock comprises a tool holder.

3. The mechanical seal arrangement according to claim 1, wherein the bearing portion of each rotary lock is a cylinder which is arranged in a cylindrical recess in the driver.

4. The mechanical seal arrangement according to claim 3, wherein a length of each locking portion is at least twice as long as a diameter of each cylindrical bearing portion.

5. The mechanical seal arrangement according to claim 1, wherein each recess in the shaft sleeve has an arcuate bottom in the shaft sleeve.

6. The mechanical seal arrangement according to claim 1, wherein a free end of the locking portion of each rotary lock is arc-shaped.

7. The mechanical seal arrangement according to claim 1, wherein a first rotary lock of the at least two rotary locks is rotatable for locking in a first rotational direction and a second rotary lock of the at least two rotary locks is rotatable for locking in a second rotational direction opposite to the first rotational direction.

8. The mechanical seal arrangement according to claim 1, wherein the connection arrangement further comprises at least two securing devices, each for securing a locking position of one of the at least two rotary locks in a respective one of the recesses of the shaft sleeve.

9. The mechanical seal arrangement according to claim 8, wherein a first securing device of the at least two securing devices is arranged at a first, circumferentially directed side of a first rotary lock of the at least two rotary locks and a second securing device of the at least two securing devices is arranged at a second, circumferentially directed side, which is opposite to the first circumferential direction, of a second rotary lock of the at least two rotary locks.

10. The mechanical seal arrangement according to claim 8, wherein each securing device is a securing screw.

11. The mechanical seal arrangement according to claim 1, further comprising a second mechanical seal having a second rotating slide ring and a second stationary slide ring defining a second sealing gap therebetween and a second driver connecting the second rotating slide ring to the shaft sleeve using a second connection arrangement.

* * * * *